United States Patent
Huang et al.

(10) Patent No.: US 11,151,765 B2
(45) Date of Patent: Oct. 19, 2021

(54) METHOD AND APPARATUS FOR GENERATING INFORMATION

(71) Applicant: BEIJING BAIDU NETCOM SCIENCE AND TECHNOLOGY CO., LTD., Beijing (CN)

(72) Inventors: Jingbo Huang, Beijing (CN); Meihua Fan, Beijing (CN); Jianbin He, Beijing (CN); Lihao Wang, Beijing (CN); Zhensheng Cai, Beijing (CN); Shikang Kong, Beijing (CN); Yafei Zhao, Beijing (CN); Jianxiang Wang, Beijing (CN); Chao Chen, Beijing (CN); Bo Chen, Beijing (CN); Quangang Li, Beijing (CN); Yu Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 2 days.

(21) Appl. No.: 16/708,902

(22) Filed: Dec. 10, 2019

(65) Prior Publication Data
US 2020/0410732 A1    Dec. 31, 2020

(30) Foreign Application Priority Data
Jun. 28, 2019   (CN) .......................... 201910573150.4

(51) Int. Cl.
| | |
|---|---|
| *G06T 13/40* | (2011.01) |
| *G06K 9/00* | (2006.01) |
| *G06T 13/20* | (2011.01) |
| *G10L 13/00* | (2006.01) |
| *G10L 13/047* | (2013.01) |

(Continued)

(52) U.S. Cl.
CPC .......... *G06T 13/40* (2013.01); *G06K 9/00711* (2013.01); *G06T 13/205* (2013.01); *G10L 13/00* (2013.01); *G10L 13/047* (2013.01); *G10L 15/1815* (2013.01); *G10L 15/22* (2013.01);
(Continued)

(58) Field of Classification Search
None
See application file for complete search history.

(56) References Cited

U.S. PATENT DOCUMENTS

| 2011/0227938 A1* | 9/2011 | Lan ........................ G06T 15/005 |
| | | 345/581 |
| 2018/0350155 A1* | 12/2018 | Norwood ................ G06T 19/20 |
| 2019/0095775 A1* | 3/2019 | Lembersky ............ G06N 3/008 |

FOREIGN PATENT DOCUMENTS

| JP | 2003248841 | 9/2003 |
| JP | 2011237795 | 11/2011 |
| JP | 2013243646 | 12/2013 |

\* cited by examiner

*Primary Examiner* — Frank S Chen
(74) *Attorney, Agent, or Firm* — Knobbe, Martens, Olson & Bear LLP

(57) ABSTRACT

Embodiments of the present disclosure provide a method and apparatus for generating information, and relate to the field of cloud computation. The method may include: receiving a video and an audio of a user from a client; analyzing the video and the audio to determine an intention category of the user; generating feedback information according to the intention category of the user and a preset service information set; generating a video of a pre-established three-dimensional virtual portrait by means of an animation engine based on the feedback information; and transmitting the video of the three-dimensional virtual portrait to the client, for the client to present to the user.

15 Claims, 5 Drawing Sheets

(51) Int. Cl.
*G10L 15/18* (2013.01)
*G10L 15/22* (2006.01)

(52) U.S. Cl.
CPC ..... *G06K 9/00302* (2013.01); *G06K 9/00335* (2013.01); *G10L 2015/223* (2013.01)

METHOD AND APPARATUS FOR GENERATING INFORMATION

CROSS-REFERENCE TO RELATED APPLICATIONS

This application claims priority to Chinese Application No. 201910573150.4, filed on Jun. 28, 2019 and entitled "Method and Apparatus for Generating Information," the entire disclosure of which is hereby incorporated by reference.

TECHNICAL FIELD

Embodiments of the present disclosure relate to the field of computer technology, and specifically to a method and apparatus for generating information.

BACKGROUND

With the rapid development of artificial intelligence (AI) technology, intelligent services have been applied to various fields, such as intelligent customer services and intelligent financial advisors in the financial field. By rendering a three-dimensional virtual portrait, a virtual portrait technology may provide more convenient use experience of intelligent service, thereby improving the anthropomorphic degree of the three-dimensional virtual portrait when a user interacts with the three-dimensional virtual portrait. Although the existing virtual portrait technologies have a high anthropomorphic effect, most of them still remain in scripted application scenarios, such as three-dimensional games and movie CG (Computer Graphics), and may only respond to designed actions as instructed. In addition, the research and development manpower and time costs are high.

SUMMARY

Embodiments of the present disclosure propose a method and apparatus for generating information.

In a first aspect, an embodiment of the present disclosure provides a method for generating information, the method including: receiving a video and an audio of a user from a client; analyzing the video and the audio to determine an intention category of the user; generating feedback information according to the intention category of the user and a preset service information set; generating a video of a pre-established three-dimensional virtual portrait by means of an animation engine based on the feedback information; and transmitting the video of the three-dimensional virtual portrait to the client, for the client to present to the user.

In some embodiments, the feedback information is text feedback information; and the generating a video of a pre-established three-dimensional virtual portrait by means of an animation engine based on the feedback information comprises: generating speech feedback information according to the text feedback information; acquiring target portrait information from a preset portrait information set according to the text feedback information, wherein the target portrait information comprises target expression information, target mouth shape information and target action information; and generating the video of the three-dimensional virtual portrait by means of the animation engine according to the speech feedback information, the target expression information, the target mouth shape information and the target action information.

In some embodiments, the portrait information set comprises an expression information set, a mouth shape information set and an action information set; and the acquiring target portrait information from a preset portrait information set according to the text feedback information comprises: determining target expression information from the expression information set according to the text feedback information; determining target mouth shape information from the mouth shape information set according to the text feedback information; determining target action information from the action information set according to the text feedback information; and taking the target expression information, the target mouth shape information and the target action information as target portrait information.

In some embodiments, the generating speech feedback information according to the text feedback information comprises: inputting the text feedback information into a pre-established speech generation model to generate the speech feedback information, wherein the speech generation model is used to represent a corresponding relationship between a text and a speech, and the speech generation model is obtained based on real human speech training.

In some embodiments, the method further includes: receiving a customization request for the three-dimensional virtual portrait, wherein the customization request comprises information for determining an appearance of the three-dimensional virtual portrait; and determining the appearance of the three-dimensional virtual portrait according to the customization request.

In a second aspect, an embodiment of the present disclosure provides an apparatus for generating information, the apparatus including: a receiving unit, configured for receiving a video and an audio of a user from a client; an analysis unit, configured for analyzing the video and the audio to determine an intention category of the user; a first generation unit, configured for generating feedback information according to the intention category of the user and a preset service information set; a second generation unit, configured for generating a video of a pre-established three-dimensional virtual portrait by means of an animation engine based on the feedback information; and a transmission unit, configured for transmitting the video of the three-dimensional virtual portrait to the client, for the client to present to the user.

In some embodiments, the feedback information is text feedback information; and the second generation unit 504 comprises: a speech generation unit, configured for generating speech feedback information according to the text feedback information; an acquisition unit, configured for acquiring target portrait information from a preset portrait information set according to the text feedback information, wherein the target portrait information comprises target expression information, target mouth shape information and target action information; and a video generation unit, configured for generating the video of the three-dimensional virtual portrait by means of the animation engine according to the speech feedback information, the target expression information, the target mouth shape information and the target action information.

In some embodiments, the portrait information set comprises an expression information set, a mouth shape information set and an action information set; and the acquisition unit is further configured for: determining target expression information from the expression information set according to the text feedback information; determining target mouth shape information from the mouth shape information set according to the text feedback information; determining target action information from the action information set according to the text feedback information; and taking the target expression information, the target mouth shape information and the target action information as target portrait information.

In some embodiments, the speech generation unit is further configured for: inputting the text feedback information into a pre-established speech generation model to generate the speech feedback information, wherein the speech generation model is obtained based on real human speech training.

In some embodiments, the apparatus further includes: a request receiving unit, configured for receiving a customization request for the three-dimensional virtual portrait, wherein the customization request comprises information for determining an appearance of the three-dimensional virtual portrait; and a determination unit, configured for determining the appearance of the three-dimensional virtual portrait according to the customization request.

In a third aspect, an embodiment of the present disclosure provides a device, the device including: one or more processors; and a storage apparatus, storing one or more programs, where the one or more programs, when executed by the one or more processors, cause the one or more processors to implement any implementation of the method according to the first aspect.

In a fourth aspect, an embodiment of the present disclosure provides a computer readable medium, storing a computer program thereon, where the computer program, when executed by a processor, implements any implementation of the method according to the first aspect.

The method and apparatus for generating information provided by some embodiments of the present disclosure comprise: first, receiving a video and an audio of a user from a client; second, analyzing the video and the audio to determine an intention category of the user; third, generating feedback information according to the intention category of the user and a preset service information set; and then, generating a video of a pre-established three-dimensional virtual portrait by means of an animation engine based on the feedback information; and finally, transmitting the generated video of the three-dimensional virtual portrait to the client, for the client to present to the user. Therefore, the video of the three-dimensional virtual portrait that satisfies the intention category of user is feed back to the client, thereby improving the accuracy of the live interaction between the user and the three-dimensional virtual portrait, the anthropomorphic degree of the three-dimensional virtual portrait and the user experience.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
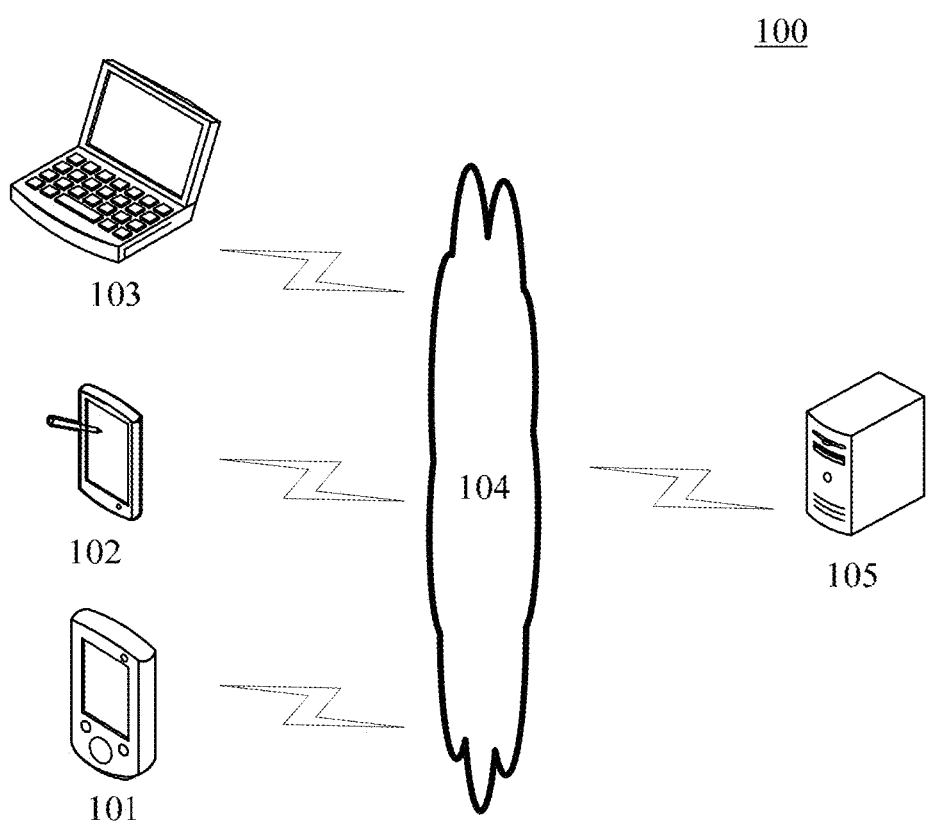
FIG. 1 is a diagram of an example system architecture in which embodiments of the present disclosure may be implemented.

FIG. 1 shows an example system architecture 100 in which a method for generating information or an apparatus for generating information according to an embodiment of the present disclosure may be implemented.

As shown in FIG. 1, the system architecture 100 may include terminal devices 101, 102, 103, a network 104, and a server 105. The network 104 serves as a medium providing a communication link between the terminal devices 101, 102, 103 and the server 105. The network 104 may include various types of connections, such as wired or wireless communication links, or optical fibers.

A user may interact with the server 105 by using the terminal device 101, 102 or 103 through the network 104 to receive or send messages, etc. The terminal device 101, 102 or 103 may be installed with various communication client applications, such as chat bot applications, web browser applications, shopping applications, search applications, instant messaging tools, mailbox clients or social platform software.

The terminal devices 101, 102 and 103 may be hardware or software. When the terminal devices 101, 102 and 103 are hardware, the terminal devices may be various electronic devices having display screens, video acquisition devices (such as cameras), audio acquisition devices (such as microphones) or the like, including but not limited to a smart phone, a tablet computer, a laptop portable computer and a desktop computer. When the terminal devices 101, 102 and 103 are software, the terminal devices may be installed in the above-listed electronic devices. The terminal device may be implemented as a plurality of software programs or software modules (e.g., software programs or software modules for providing distributed services), or as a single software program or software module, which is not specifically limited here.

The server 105 may provide various services, such as a backend server providing supports for a three-dimensional virtual portrait displayed on the terminal devices 101, 102 or 103. The backend server may analyze received videos and audios, and return a processing result (for example, a video of the three-dimensional virtual portrait) to the terminal devices 101, 102 or 103.

It should be noted that the server 105 may be hardware or software. When the server 105 is hardware, the server may be implemented as a distributed server cluster composed of a plurality of servers, or may be implemented as a single server. When the server 105 is software, the server may be implemented as a plurality of software programs or software modules (such as software programs or software modules for providing distributed services), or may be implemented as a single software program or software module, which is not specifically limited here.

It should be understood that the numbers of the terminal devices, network and server in FIG. 1 are merely illustrative. Any number of terminal devices, networks and servers may be provided based on actual requirements.

It should be noted that the method for generating information provided by some embodiments of the present disclosure is generally executed by the server 105, and the apparatus for generating information is generally provided in the server 105.

Figure 2:
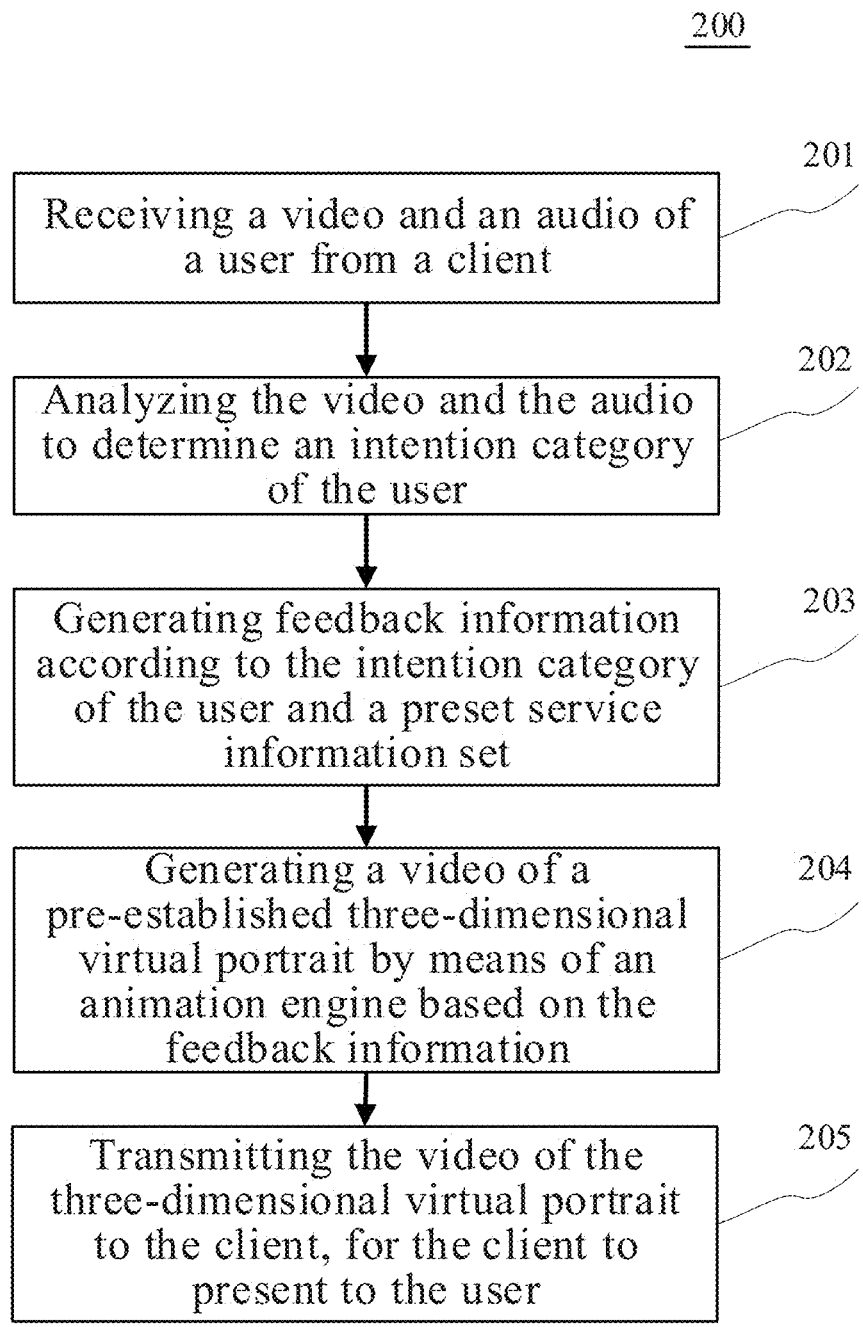
FIG. 2 is a flowchart of a method for generating information according to an embodiment of the present disclosure.

Referring to FIG. 2, a flow 200 of a method for generating information according to an embodiment of the present disclosure is shown. The method for generating information comprises the following steps.

Step 201: receiving a video and an audio of a user from a client.

In the present embodiment, an executing body (for example, the server 105 shown in FIG. 1) of the method for generating information may receive a video and an audio of a user from a client by means of a wired connection or a wireless connection. Here, when the user inputs text information through the client, the client may also send the text information to the executing body. In addition, the client may also send its own location information to the executing body.

Generally, the user may perform information interaction using a client installed in a terminal (for example, the terminal devices 101, 102, 103 shown in FIG. 1). Here, the terminal used by the user may be provided with a video acquisition device (for example, a camera), an audio acquisition device (for example, a microphone) or the like. The terminal may acquire the video, audio and other information of the user in real time, and the client transmits the acquired video, audio and other information of the user to the executing body in real time. The executing body here may be a backend server that supports the client. Hence, the backend server may process the video, audio and other information of the user in real time.

Step 202: analyzing the video and the audio to determine an intention category of the user.

In the present embodiment, the executing body may perform various analysis processing on the video and audio received in step 201, so as to determine an intention category of the user. As an example, the executing body may perform facial recognition, expression recognition, gesture recognition, posture recognition or the like on a video frame in the video, so as to obtain user feature information such as the identity, expression, gesture or posture of the user. The executing body may further perform speech recognition on the audio to obtain text information corresponding to the audio, and then the executing body may perform semantic analysis or the like on user feature information and text information corresponding to the audio, thereby determining the intention category of the user. The intention category here may be used to indicate the category of the intention of the user that sends the video and audio through the client.

In practice, the intention category may be preset according to a service scenario to which the client is applied.

Taking the service scenario to which the client is applied as a financial (for example, bank) scenario example, a preset intention category may include personal information update, service consultation and service processing. In this way, the executing body may use various semantic analysis means (for example, word segmentation, part-of-speech tagging and named entity recognition) for the user feature information and the text information corresponding to the audio, thereby determining the intention category of the user. As an example, the executing body may segment the user feature information and the text information corresponding to the audio so as to obtain at least one segmented word. The executing body then input the at least one segmented word into a pre-established intention classification model so as to obtain the intention category of the user. The intention classification model is used to represent the corresponding relationship between a segmented word set and the intention category. The intention classification model may be obtained using a machine learning method.

Step 203: generating feedback information according to the intention category of the user and a preset service information set.

In the present implementation, the executing body may generate feedback information according to the intention category of the user and a preset service information set. The service information set here is configured for storing various service information associated with service scenarios to which the client is applied. As an example, assuming that the service scenario to which the client is applied is a banking scenario and the intention category of the user is service consultation, the executing body may obtain information related to the service to be consulted by the user from the service information set, and generate feedback information according to acquired relevant information. For example, the acquired relevant information may be directly used as feedback information. For another example, the feedback information is generated using the acquired relevant information according to a preset speech template.

Step 204: generating a video of a pre-established three-dimensional virtual portrait by means of an animation engine based on the feedback information.

In the present embodiment, the executing body may generate a video of a pre-established three-dimensional virtual portrait by means of an animation engine based on the feedback information generated in step 203. Specifically, the executing body may first convert the feedback information into a reply audio by means of TTS (Text To Speech). According to actual needs, the reply audio may be a reply audio in various languages, such as Chinese, English, Japanese, Korean or Thai. Typically, the reply audio is in the same language as the audio of the user. As an example, when the feedback information is converted into the reply audio, the executing body may set certain characteristics (such as tone, speech rate or timbre) of the converted reply audio based on the user feature information. The executing body here may prestore a corresponding relationship between the user feature information and the characteristics of the reply audio. For example, the speech rate of the reply audio from a younger user may be reduced. Thereafter, the executing body may generate a video of the three-dimensional virtual portrait based on the reply audio. The three-dimensional virtual portrait here may be developed by an animation engine, which may include but not limited to UE4 (Unreal Engine 4), Maya and Unity 3D.

Step 205: transmitting the generated video of the three-dimensional virtual portrait to the client, for the client to present to the user.

In the present implementation, the executing body may transmit the video of the three-dimensional virtual portrait that is generated in step 204 to the client, for the client to present the three-dimensional virtual portrait to the user, thereby realizing an interaction between the user and the three-dimensional virtual portrait.

In some optional implementations of the present embodiment, the method for generating information further includes following steps that are not shown in FIG. 2.

First, receiving a customization request for a three-dimensional virtual portrait.

In the present implementation, the executing body may further receive a customization request for a three-dimensional virtual portrait. The customization request may include information for determining the appearance of the three-dimensional virtual portrait. As an example, the information included in the customization request for determining the appearance of the three-dimensional virtual portrait may be information acquired based on a real person. For example, the information for determining the appearance of the three-dimensional virtual portrait may be acquired by an image acquisition device (for example, a camera), a sensor or the like in a special device (such as a hamlet) that is wore by the real person. The executing body may generate a three-dimensional virtual portrait with a real person effect according to the information acquired by the real person. As another example, the information included in the customization request for determining the appearance of the three-dimensional virtual portrait may be cartoon image design data. The executing body may generate a three-dimensional virtual portrait with a cartoon effect according to the cartoon image design data.

Then, determining an appearance of the three-dimensional virtual portrait according to the customization request.

In the present implementation, the executing body may determine the appearance of the three-dimensional virtual portrait according to the information for determining the appearance of the three-dimensional virtual portrait in the customization request. As an example, the three-dimensional virtual portrait may be a full-body portrait or a half-length portrait, which is not limited herein. By means of the present implementation, the executing body may generate a three-dimensional virtual portrait according to the customization request, so as to customize the image of the three-dimensional virtual portrait.

Figure 3:
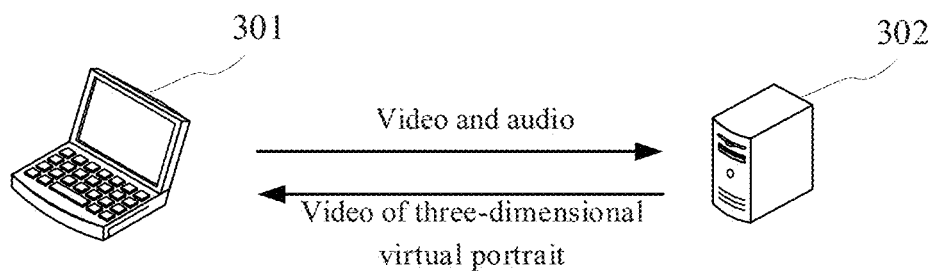
FIG. 3 is a schematic diagram of an application scenario of the method for generating information according to an embodiment of the present disclosure.

Further referring to FIG. 3, a schematic diagram of a bank application scenario of the method for generating information according to an embodiment of the present embodiment is shown. In the application scenario in FIG. 3, a user first transmits a video and an audio "I want to know a financial product" thereof to a server 302 by means of a client 301; next, the server 302 analyzes the received video and audio to determine that the intention category of the user is a service consultation for a financial product. Thereafter, the server 302 generates feedback information including information of a plurality of financial products according to the intention category of the user and a service information set; the server 302 then generates a video of a three-dimensional virtual portrait by means of an animation engine based on the feedback information; and finally, the server 302 sends the generated video of the three-dimensional virtual portrait to the client 301 for the client 301 to present to the user.

The method provided by some embodiments of the present disclosure analyzes the video and the audio of the user to determine the intention category of the user, generates feedback information according to the intention category of the user and a preset service information set, and generates a video of a three-dimensional virtual portrait based on the feedback information, so as to feed back to the client the video of the three-dimensional virtual portrait that satisfies the intention category of user, thereby improving the accuracy of the live interaction between the user and the three-dimensional virtual portrait, the anthropomorphic degree of the three-dimensional virtual portrait and the user experience.

Figure 4:
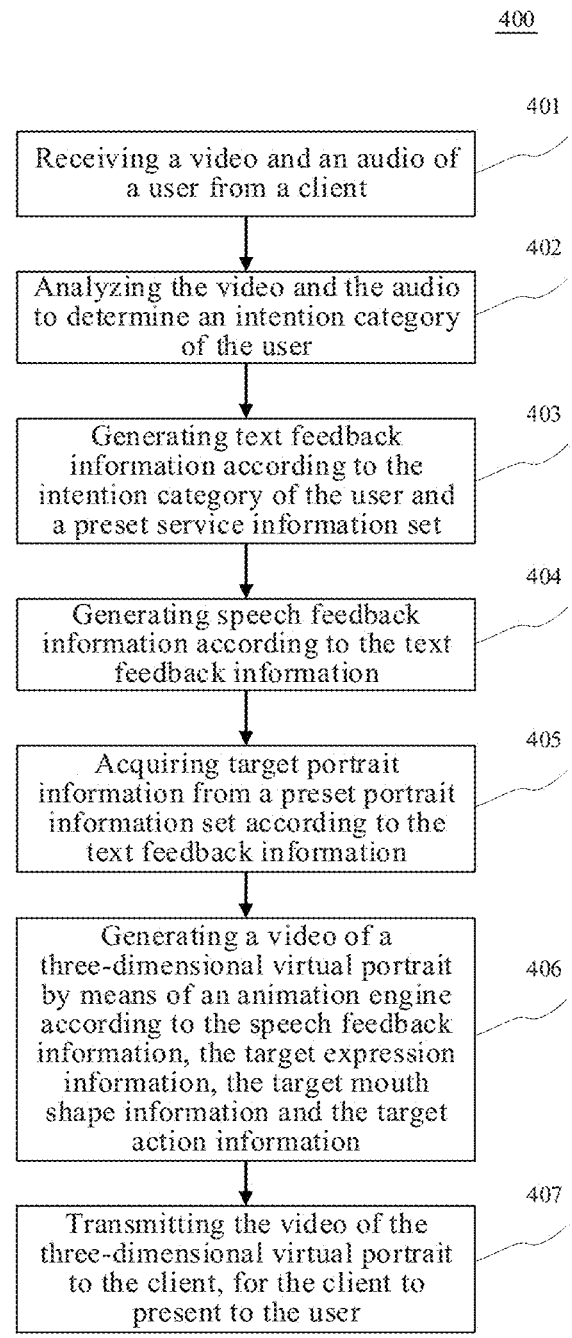
FIG. 4 is a flowchart of another embodiment of the method for generating information according to another embodiment of the present disclosure.

Further referring to FIG. 4, a flow 400 of another embodiment of the method for generating information is shown. The flow 400 of the method for generating information comprises the following steps.

Step 401: receiving a video and an audio of a user from a client.

In the present embodiment, step 401 is basically consistent with step 201 in the embodiment shown in FIG. 2, and such step will not be repeated here.

Step 402: analyzing the video and the audio to determine an intention category of the user.

In the present embodiment, step 402 is basically consistent with step 202 in the embodiment shown in FIG. 2, and such step will not be repeated here.

Step 403: generating text feedback information according to the intention category of the user and a preset service information set.

In the present embodiment, an executing body may generate feedback information according to the intention category of the user and a preset service information set. The service information set here is configured for storing various service information associated with service scenarios to which the client is applied, and the feedback information may be text feedback information.

Step 404: generating speech feedback information according to the text feedback information.

In the present embodiment, the executing body may generate speech feedback information according to the text feedback information generated in step 403. Specifically, the executing body may generate the text feedback information into speech feedback information by means of TTS (Text to Speech).

In some optional implementations of the present embodiment, step 404 may be executed by inputting the text feedback information into a pre-established speech generation model so as to generate speech feedback information.

In the present embodiment, the executing body may input the text feedback information into a pre-established speech generation model, thereby obtaining speech feedback information. The speech generation model may be used to represent the corresponding relationship between a text and a speech. The speech generation model is obtained based on real human speech training. As an example, the speech generation model may be a machine learning model. The machine learning model may be obtained by training using the following methods: first, acquiring a training sample set, where training samples in the training sample set include sample texts and human speeches corresponding thereto; and then training using the sample texts of the training samples in the training sample set as inputs, and using the human speeches corresponding to the inputted sample texts as desired output, so as to obtain the machine learning model.

Step 405: acquiring target portrait information from a preset portrait information set according to the text feedback information.

In the present embodiment, the executing body may acquire target portrait information from a preset portrait information set according to the text feedback information generated in step 403. The target portrait information includes target expression information, target mouth shape information and target action information. The target expression information may be for controlling the expression of the three-dimensional portrait while playing back the speech feedback information acquired in step 404. The target mouth shape information may be for controlling the mouth shape of the three-dimensional portrait while playing back the speech feedback information acquired in step 404. The target action information may be configured for controlling the posture, gesture or the like of the three-dimensional portrait while playing back the speech feedback information acquired in step 404.

In some optional implementations of the present embodiment, the portrait information set includes an expression information set, a mouth shape information set and an action information set. The expression information set here may include information of a plurality of preset expressions. The mouth shape information set may include information of a plurality of mouth shape changes. The action information set may include action information of a plurality of preset posture and gesture changes. Step 405 may be specifically executed as follows.

First, determining target expression information from the expression information set according to the text feedback information.

In the present implementation, the executing body may prestore a plurality of corresponding relationships between texts and the expression information, and these corresponding relationships may be set manually. Therefore, the executing body may match the text feedback information with a plurality of texts in the plurality of corresponding relationships. If a text among the plurality of texts is identical with or similar to the text feedback information, the executing body takes expression information corresponding to the text as target expression information.

Next, determining target mouth shape information from the mouth shape information set according to the text feedback information.

In the present implementation, the executing body may prestore a plurality of corresponding relationships between texts and the mouth shape information, and these corresponding relationships may be set manually. Therefore, the executing body may determine target mouth shape information from the mouth shape information set according to the text feedback information.

Then, determining target action information from the action information set according to the text feedback information.

In the present implementation, the executing body may prestore a plurality of corresponding relationships between texts and the action information, and these corresponding relationships may be set manually. Therefore, the executing body may determine target action information from the action information set according to the text feedback information.

Finally, taking the target expression information, the target mouth shape information and the target action information as target portrait information.

In the present implementation, the executing body may take the target expression information, the target mouth shape information and the target action information as target portrait information.

Step 406: generating a video of a three-dimensional virtual portrait by means of an animation engine according to the speech feedback information, the target expression information, the target mouth shape information and the target action information.

In the present embodiment, the executing body may transmit the speech feedback information, the target expression information, the target mouth shape information and the target action information to an animation engine. The animation engine may render a video of a three-dimensional virtual portrait according to the speech feedback information, the target expression information, the target mouth shape information and the target action information, and feeds the rendered video back to the executing body. Here, the video of three-dimensional virtual portrait that is rendered by the animation engine is a video including the speech feedback information.

Step 407: transmitting the generated video of the three-dimensional virtual portrait to the client, for the client to present to the user.

In the present embodiment, step 407 is basically consistent with step 205 in the embodiment shown in FIG. 2, and such step will not be repeated here.

As shown in FIG. 4, the flow 400 of the method for generating information in the present embodiment, compared with the corresponding embodiment in FIG. 2, highlights the step of acquiring target portrait information from a preset portrait information set according to the text feedback information. Hence, the solution described in the present embodiment may quickly acquire target portrait information for generating the three-dimensional virtual portrait according to the text feedback information, which improves the efficiency of generating the video of the three-dimensional virtual portrait, thereby improving the real time performance of the interaction between the client and the server.

Figure 5:
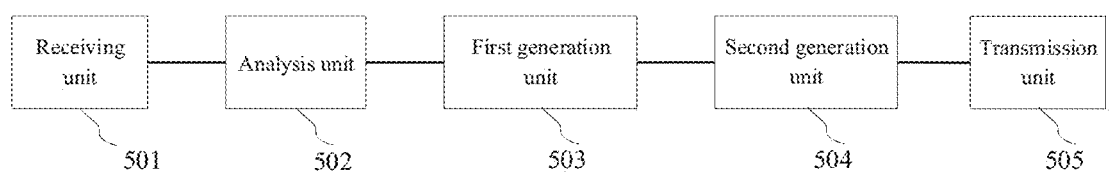
FIG. 5 is a schematic structural diagram of an apparatus for generating information according to an embodiment of the present disclosure.

Further referring to FIG. 5, as an implementation of the method shown in each figure, an embodiment of the present disclosure provides an apparatus for generating information. The apparatus embodiment may correspond to the method embodiment shown in FIG. 2, and the apparatus may be specifically applied to various electronic devices.

As shown in FIG. 5, the apparatus 500 for generating information according to the present embodiment comprises a receiving unit 501, an analysis unit 502, a first generation unit 503, a second generation unit 504 and a transmission unit 505. The receiving unit 501 is configured for receiving a video and an audio of a user from a client; the analysis unit 502 is configured for analyzing the video and the audio to determine an intention category of the user; the first generation unit 503 is configured for generating feedback information according to the intention category of the user and a preset service information set; the second generation unit 504 is configured for generating a video of a pre-established three-dimensional virtual portrait by means of an animation engine based on the feedback information; and the transmission unit 505 is configured for transmitting the video of the three-dimensional virtual portrait to the client, for the client to present to the user.

In the present embodiment, the specific processing of the receiving unit 501, the analysis unit 502, the first generation unit 503, the second generation unit 504 and the transmission unit 505 in the apparatus 500 for generating information and technical effects brought thereby may be respectively referred to steps 201, 202, 203, 204 and 205 in the corresponding embodiment shown in FIG. 2, and will not be repeated here.

In some optional implementations of the present embodiment, the feedback information is text feedback information;

and the second generation unit 504 comprises: a speech generation unit (not shown), configured for generating speech feedback information according to the text feedback information; an acquisition unit (not shown), configured for acquiring target portrait information from a preset portrait information set according to the text feedback information, wherein the target portrait information comprises target expression information, target mouth shape information and target action information; and a video generation unit (not shown), configured for generating the video of the three-dimensional virtual portrait by means of the animation engine according to the speech feedback information, the target expression information, the target mouth shape information and the target action information.

In some optional implementations of the present embodiment, the portrait information set comprises an expression information set, a mouth shape information set and an action information set; and the acquisition unit is further configured for: determining target expression information from the expression information set according to the text feedback information; determining target mouth shape information from the mouth shape information set according to the text feedback information; determining target action information from the action information set according to the text feedback information; and taking the target expression information, the target mouth shape information and the target action information as target portrait information.

In some optional implementations of the present embodiment, the speech generation unit is further configured for: inputting the text feedback information into a pre-established speech generation model to generate the speech feedback information, wherein the speech generation model is obtained based on real human speech training.

In some optional implementations of the present embodiment, the apparatus 500 further includes: a request receiving unit (not shown), configured for receiving a customization request for the three-dimensional virtual portrait, wherein the customization request comprises information for determining an appearance of the three-dimensional virtual portrait; and a determination unit (not shown), configured for determining the appearance of the three-dimensional virtual portrait according to the customization request.

Figure 6:
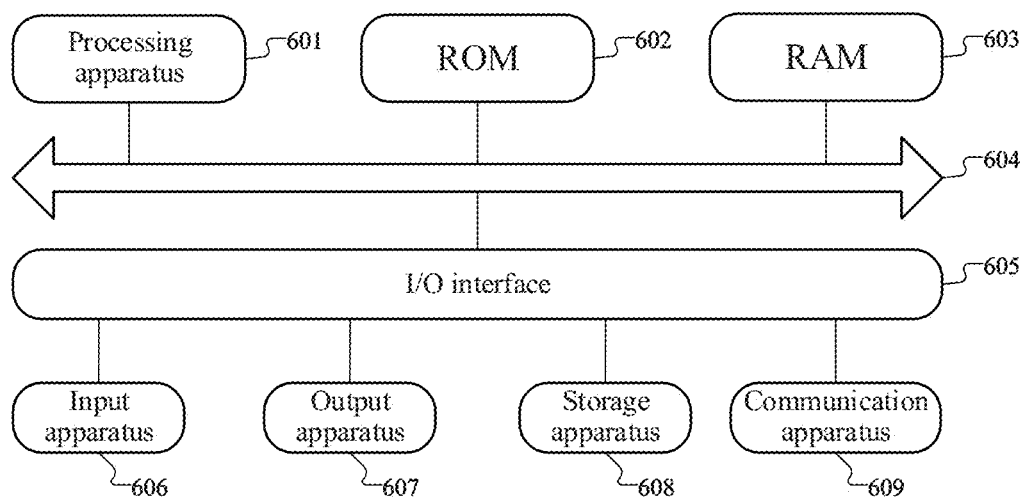
FIG. 6 is a schematic structural diagram of a computer system adapted to implement a sever of embodiments of the present disclosure.

Referring to FIG. 6 below, a schematic structural diagram of an electronic device (e.g., the server in FIG. 1) 600 adapted to implement some embodiments of the present disclosure is shown. The electronic device shown in FIG. 6 is merely an example, and should not limit the functions and scope of use of embodiments of the present disclosure.

As shown in FIG. 6, the electronic device 600 may include a processing apparatus (e.g., a central processing apparatus, or a graphics processor) 601, which may execute various appropriate actions and processes in accordance with a program stored in a read only memory (ROM) 602 or a program loaded into a random access memory (RAM) 603 from a storage apparatus 608. The RAM 603 further stores various programs and data required by operations of the electronic device 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 including a touch screen, a touch pad, a keyboard, a mouse, a camera, a microphone, an accelerometer, a gyroscope, or the like; an output apparatus 607 including a liquid crystal displayer (LCD), a speaker, a vibrator, or the like; a storage apparatus 608 including a tape, a hard disk, or the like; and a communication apparatus 609. The communication apparatus 609 may allow the electronic device 600 to exchange data with other devices through wireless or wired communication. While FIG. 6 shows the electronic device 600 having various apparatuses, it should be understood that it is not necessary to implement or provide all of the apparatuses shown in the figure. More or fewer apparatuses may be alternatively implemented or provided. Each block shown in FIG. 6 may represent an apparatus, or represent a plurality of apparatuses as required.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 609, or may be installed from the storage apparatus 608, or may be installed from the ROM 602. The computer program, when executed by the processing apparatus 601, implements the above functions defined by the methods of some embodiments of the present disclosure.

It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as apart of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be included in the electronic device, or a stand-alone computer readable medium without being assembled into the electronic device. The computer readable medium stores one or more programs. The one or more programs, when executed by the electronic device, cause the electronic device to: receiving a video and an audio of a user from a client; analyzing the video and the audio to determine an intention category of the user; generating feedback information according to the intention category of the user and a preset service information set; generating a video of a pre-established three-dimensional virtual portrait by means of an animation engine based on the feedback information; and transmitting the video of the three-dimensional virtual portrait to the client, for the client to present to the user.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flowcharts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software or hardware. The described units may also be provided in a processor, for example, described as: a processor including a receiving unit, an analysis unit, a first generation unit, a second generation unit, and a transmission unit. The names of the units do not constitute a limitation to such units themselves in some cases. For example, the receiving unit may be further described as "a unit configured for receiving a video and an audio of a user from a client."

The above description only provides an explanation of embodiments of the present disclosure and the technical principles used. It should be appreciated by those skilled in the art that the inventive scope of the present disclosure is not limited to the technical solutions formed by the particular combinations of the above-described technical features.

The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for generating information, comprising:
receiving a video and an audio of a user from a client;
analyzing the video and the audio to determine an intention category of the user, the analyzing comprising performing recognition on a video frame in the video to obtain user feature information, performing speech recognition on the audio to obtain text information corresponding to the audio, segmenting the user feature information and the text information corresponding to the audio to obtain at least one segmented word, and inputting the at least one segmented word into a pre-established intention classification model to obtain the intention category of the user;
generating feedback information according to the intention category of the user and a preset service information set, the intention category being preset according to a service scenario to which the client is applied, and the preset service information set being configured for storing various service information associated with the service scenario to which the client is applied;
generating a video of a pre-established three-dimensional virtual portrait by an animation engine based on the feedback information; and
transmitting the video of the three-dimensional virtual portrait to the client, for the client to present to the user.

2. The method according to claim 1, wherein the feedback information is text feedback information; and
wherein the generating a video of a pre-established three-dimensional virtual portrait by the animation engine based on the feedback information comprises:
generating speech feedback information according to the text feedback information;
acquiring target portrait information from a preset portrait information set according to the text feedback information, wherein the target portrait information comprises target expression information, target mouth shape information and target action information; and
generating the video of the three-dimensional virtual portrait by the animation engine according to the speech feedback information, the target expression information, the target mouth shape information and the target action information.

3. The method according to claim 2, wherein the preset portrait information set comprises an expression information set, a mouth shape information set and an action information set; and
wherein the acquiring target portrait information from a preset portrait information set according to the text feedback information comprises:
determining target expression information from the expression information set according to the text feedback information;
determining target mouth shape information from the mouth shape information set according to the text feedback information;
determining target action information from the action information set according to the text feedback information; and taking the target expression information, the target mouth shape information and the target action information as target portrait information.

4. The method according to claim 2, wherein the generating speech feedback information according to the text feedback information comprises:
inputting the text feedback information into a pre-established speech generation model to generate the speech feedback information, wherein the speech generation model is used to represent a corresponding relationship between a text and a speech, and the speech generation model is obtained based on real human speech training.

5. The method according to claim 1, further comprising:
receiving a customization request for the three-dimensional virtual portrait, wherein the customization request comprises information for determining an appearance of the three-dimensional virtual portrait; and
determining the appearance of the three-dimensional virtual portrait according to the customization request.

6. An apparatus for generating information, comprising:
at least one processor; and
a memory storing instructions, the instructions when executed by the at least one processor, cause the at least one processor to perform operations, the operations comprising:
receiving a video and an audio of a user from a client;
analyzing the video and the audio to determine an intention category of the user, the analyzing comprising performing recognition on a video frame in the video to obtain user feature information, performing speech recognition on the audio to obtain text information corresponding to the audio, segmenting the user feature information and the text information corresponding to the audio to obtain at least one segmented word, and inputting the at least one segmented word into a pre-established intention classification model to obtain the intention category of the user;
generating feedback information according to the intention category of the user and a preset service information set, the intention category being preset according to a service scenario to which the client is applied, and the preset service information set being configured for storing various service information associated with the service scenario to which the client is applied;
generating a video of a pre-established three-dimensional virtual portrait by an animation engine based on the feedback information; and
transmitting the video of the three-dimensional virtual portrait to the client, for the client to present to the user.

7. The apparatus according to claim 6, wherein the feedback information is text feedback information; and
the generating a video of a pre-established three-dimensional virtual portrait by the animation engine based on the feedback information comprises:
generating speech feedback information according to the text feedback information;
acquiring target portrait information from a preset portrait information set according to the text feedback information, wherein the target portrait information comprises target expression information, target mouth shape information and target action information; and
generating the video of the three-dimensional virtual portrait by the animation engine according to the speech feedback information, the target expression information, the target mouth shape information and the target action information.

8. The apparatus according to claim 7, wherein the preset portrait information set comprises an expression information set, a mouth shape information set and an action information set; and
wherein the acquiring target portrait information from a preset portrait information set according to the text feedback information comprises:
determining target expression information from the expression information set according to the text feedback information;
determining target mouth shape information from the mouth shape information set according to the text feedback information;
determining target action information from the action information set according to the text feedback information; and
taking the target expression information, the target mouth shape information and the target action information as target portrait information.

9. The apparatus according to claim 7, wherein the generating speech feedback information according to the text feedback information comprises:
inputting the text feedback information into a pre-established speech generation model to generate the speech feedback information, wherein the speech generation model is used to represent a corresponding relationship between a text and a speech, and the speech generation model is obtained based on real human speech training.

10. The apparatus according to claim 6, the operations further comprising:
receiving a customization request for the three-dimensional virtual portrait, wherein the customization request comprises information for determining an appearance of the three-dimensional virtual portrait; and
determining the appearance of the three-dimensional virtual portrait according to the customization request.

11. A non-transitory computer readable medium, storing a computer program, wherein the computer program, when executed by a processor, causes the processor to perform operations, the operations comprising:
receiving a video and an audio of a user from a client;
analyzing the video and the audio to determine an intention category of the user, the analyzing comprising performing recognition on a video frame in the video to obtain user feature information, performing speech recognition on the audio to obtain text information corresponding to the audio, segmenting the user feature information and the text information corresponding to the audio to obtain at least one segmented word, and inputting the at least one segmented word into a pre-established intention classification model to obtain the intention category of the user;
generating feedback information according to the intention category of the user and a preset service information set, the intention category being preset according to a service scenario to which the client is applied, and the preset service information set being configured for storing various service information associated with the service scenario to which the client is applied;
generating a video of a pre-established three-dimensional virtual portrait by an animation engine based on the feedback information; and
transmitting the video of the three-dimensional virtual portrait to the client, for the client to present to the user.

12. The non-transitory computer readable medium according to claim 11, wherein the feedback information is text feedback information; and
- wherein the generating a video of a pre-established three-dimensional virtual portrait by the animation engine based on the feedback information comprises:
- generating speech feedback information according to the text feedback information;
- acquiring target portrait information from a preset portrait information set according to the text feedback information, wherein the target portrait information comprises target expression information, target mouth shape information and target action information; and
- generating the video of the three-dimensional virtual portrait by the animation engine according to the speech feedback information, the target expression information, the target mouth shape information and the target action information.

13. The non-transitory computer readable medium according to claim 12, wherein the preset portrait information set comprises an expression information set, a mouth shape information set and an action information set; and
- wherein the acquiring target portrait information from a preset portrait information set according to the text feedback information comprises:
- determining target expression information from the expression information set according to the text feedback information;
- determining target mouth shape information from the mouth shape information set according to the text feedback information;
- determining target action information from the action information set according to the text feedback information; and
- taking the target expression information, the target mouth shape information and the target action information as target portrait information.

14. The non-transitory computer readable medium according to claim 12, wherein the generating speech feedback information according to the text feedback information comprises:
- inputting the text feedback information into a pre-established speech generation model to generate the speech feedback information, wherein the speech generation model is used to represent a corresponding relationship between a text and a speech, and the speech generation model is obtained based on real human speech training.

15. The non-transitory computer readable medium according to claim 11, the operations further comprising:
- receiving a customization request for the three-dimensional virtual portrait, wherein the customization request comprises information for determining an appearance of the three-dimensional virtual portrait; and
- determining the appearance of the three-dimensional virtual portrait according to the customization request.

* * * * *